J. MILLER.

Assignor to the Pressure Extract Co.

METHODS OF MAKING TEA, COFFEE, AND OTHER EXTRACTS.

No. 7,882. Reissued Sept. 11, 1877.

WITNESSES:

W. W. Hollingsworth

John C. Kenyon

INVENTOR:

Jonathan Miller

BY

Munn & Co.

ATTORNEYS.

UNITED STATES PATENT OFFICE.

JONATHAN MILLER, OF HIMROD'S, NEW YORK, ASSIGNOR TO THE PRESSURE EXTRACT COMPANY, OF TRENTON, NEW JERSEY.

IMPROVEMENT IN METHODS OF MAKING TEA, COFFEE, AND OTHER EXTRACTS.

Specification forming part of Letters Patent No. 176,980, dated May 2, 1876; Reissue No. 7,882, dated September 11, 1877; application filed April 4, 1877.

DIVISION A.

*To all whom it may concern:*

Be it known that I, JONATHAN MILLER, of Himrod's, in the county of Yates and State of New York, have invented a new and Improved Method of Making Tea, Coffee, and other Extracts; and I do hereby declare that the following is a full, clear, and exact description of the same, reference being had to the accompanying drawing, forming part of this specification, in which—

Figure 1:
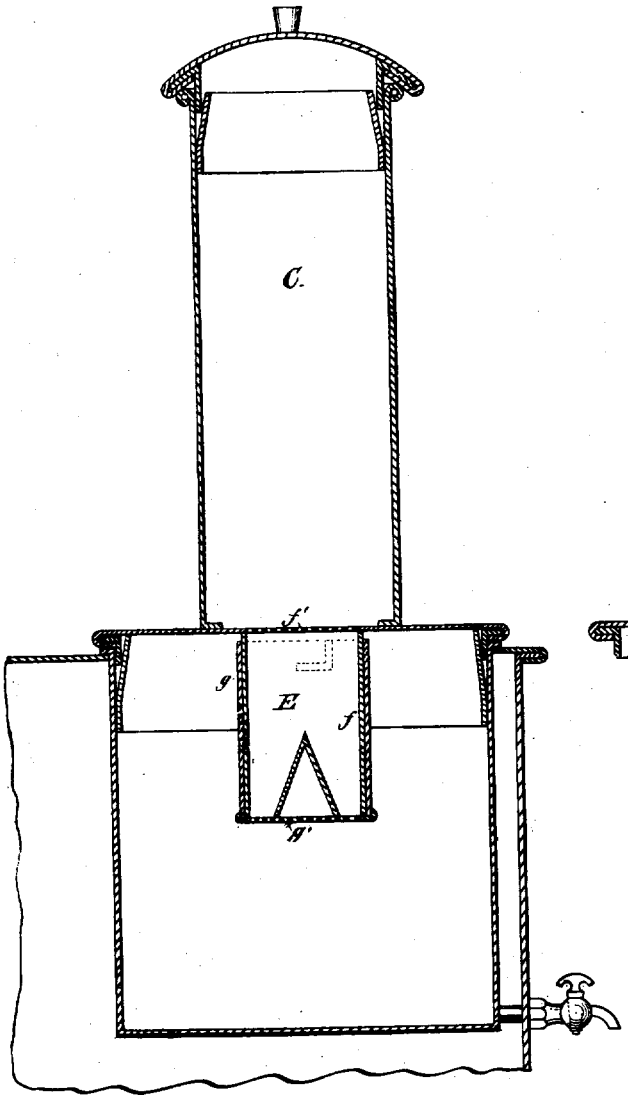
Figure 2:
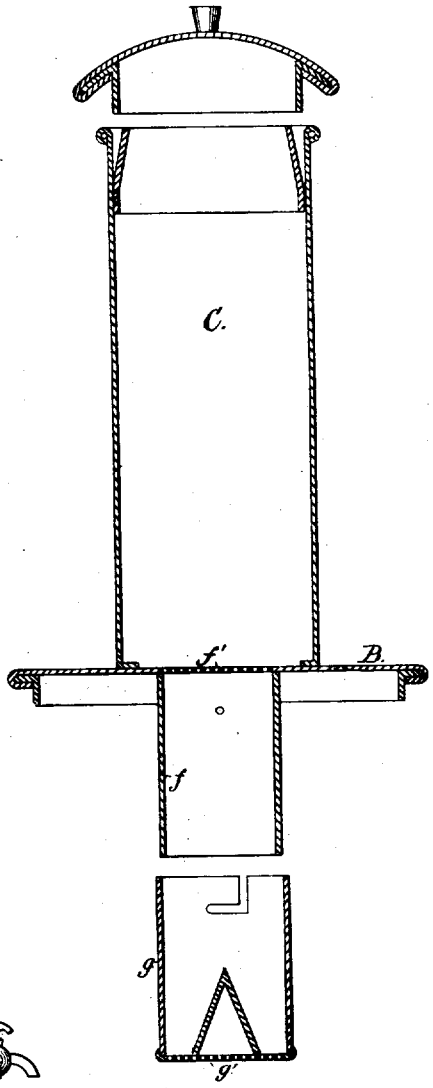

Figure 1 is a vertical section. Fig. 2 is a vertical section of the liquid-receptacle and press, with the cup of the latter detached.

My invention covers a new method of making tea, coffee, and other extracts, which method proceeds upon the employment of pressure caused by the expansion of the material used, the said method covering the production of every kind of extract from materials or substances which can be expanded by moisture. It consists in filling a tight and unyielding chamber or press full of the material, reduced to such a degree of fineness as will enable it to expand quickly; then permitting the access of the hot or cold liquid to the material in the press from a receptacle for holding said liquid suitably placed, whereby the expansion of the material consequent upon the absorption of the water or other liquid produces a pressure which closes up the little interstices between the particles.

This pressure forces the air from the press, prevents steam from generating, and holds the liquid and material motionless until after the extract has passed from the material into the liquid, where there is room for it, without increasing the bulk, thereby imparting the extractive principles of the material to the solvent, in the original proportions in which said extractive principle existed in said material.

In carrying out my invention, I prefer to employ a device such as is illustrated in the drawing, in which C is a receptacle for the water or liquid forming the solvent, and E the holder or press for the coffee or other material. The said press is attached to the water-receptacle, and is separated therefrom by a perforated diaphragm, *f'*. The press also has a detachable cup portion, *g*, which has a perforated bottom, *g'*, which said cup portion is made to fit upon the shell *f*, attached to the liquid-receptacle, and is rigidly fastened to the same by bayonet slots and pins, or other devices which will not permit the cup to give to the expansion of the ground material. The device as thus described, is provided with a flange, B, which is designed to rest upon the top of an urn or other suitable receptacle for the extract, so as to act as a cover to said urn.

The manufacture of coffee and tea as a beverage, and all kinds of extracts for medicinal purposes or otherwise, has been attended with certain difficulties which have not been overcome heretofore, notwithstanding that numerous methods and devices have been produced at different periods.

The reason for this is that all methods and devices have been precisely alike in the one respect that they allow the material to move or float in the liquid employed in making the extract.

The fact that the soluble properties of any material must be obtained in their original proportion in order to retain the precise aroma and flavor seems to have been neglected. If hot or cold liquor be passed through any material, as in percolation, the proportion of the properties is destroyed, although the entire extract may finally lodge in the same vessel; and the result will be the same if steam be forced through material, or vapor be allowed to form upon the same during the process of extraction.

The advantages of this method are that the properties of any material may be obtained in their original proportion, thereby retaining the precise aroma and flavor of the original material. Beverages made by this method are healthier for that reason, and all extracts made under this pressure will keep longer than others.

What is meant by obtaining the extracts in their original proportions is the simultaneous separation from the ground material of the different soluble elements as they exist in said material, which constitute the proper flavor, which elements are liable to be separated by other methods, the more soluble and volatile passing off first, and the less soluble and less volatile passing off afterward. This separation of the soluble component elements of the extractive matter is such that, although they mechanically mix in the urn, they do not reunite in the same and assume the same relative proportions existing in the ground material, which proportion is the only one which represents the true flavor and strength of the extract.

By filling the press full of the dry material, made sufficiently fine to admit of ready expansion, the pressure will commence as soon as the liquid enters the same, thereby holding the whole liquid and material motionless, driving the air from the same, and preventing the generation of steam, so that the entire soluble properties of the material must enter the liquid without separation, as there is neither steam, air, nor motion in the press, and the extract cannot escape from the same until the passage of the soluble properties of the material into the liquid (where there is room for them without increasing the bulk) has relieved the pressure.

If a strainer or aperture for the escape of the extract be placed at the bottom of the press, it will come out entirely free from sediment, as the expansion of the material forces the particles so firmly together that the finest dust cannot escape; neither can it clog the strainers. By this means a most perfect strainer is formed, which entirely obviates the necessity of using felt, paper, or other substances for clarifying.

Another advantage derived from my method is that the properties of certain kinds of material may be readily extracted with cold water, thereby retaining the natural aroma and flavor of the original material, which extraction has been considered impractical heretofore except by distillation. The only condition required is that the material shall be completely pulverized, and the press shaken gently at the time of filling. Then the pressure will commence before any considerable portion of the liquid has escaped, and the whole mass will be held motionless, and the result obtained as hereinbefore described.

I am aware of the fact that coffee-pots have been constructed in which the ground coffee has been held down in the holder by a weight, and that an expanding holder has been employed to yield to the increased bulk of coffee when saturated with water.

In manufacturing extracts by my method, however, the exertion of force requisite to compress the grains and close the interstices is such as to render any weight or spring wholly impractical for the purpose, the only way to secure the full benefit of the principle involved being to utilize all of the expansive force by causing it to react in an unyielding chamber, instead of allowing the coffee-holder or press to adapt itself to the increased volume of the expanded grains.

Having thus described my invention, what I claim as new is—

The herein-described method of making tea, coffee, and other extracts, by means of pressure caused by the expansion of the material in an unyielding chamber, substantially as described, and for the purpose set forth.

JONATHAN MILLER.

Witnesses:

SOLON C. KEMON,
JAMES H. GRIDLEY.